United States Patent Office 3,516,967
Patented June 23, 1970

3,516,967
POLYIMINOIMIDE AND POLYAMIDE
NITRILE COMPOSITIONS
Rolf E. Funer, Springfield, Pa., assignor to E. I. du Pont de Nemours and Company, Wilmington, Del., a corporation of Delaware
No Drawing. Filed Oct. 28, 1968, Ser. No. 771,292
Int. Cl. C08g 20/32
U.S. Cl. 260—47                           15 Claims

ABSTRACT OF THE DISCLOSURE

Novel polyiminoimide compositions and their novel precursor polyamide nitrile compositions are prepared by conversion of an aromatic polyamide acid to a corresponding polyisoimide, subsequent reaction of the polyisoimide with ammonia to form a polyamide-amide, and treatment of the polyamide-amide with a dehydrating agent to form a polyamide-nitrile. Since the preparation of the polyiminoimides from the corresponding polyamide nitriles proceeds without extensive evolution of volatile by-products, the resultant polyiminoimides are particularly useful in making blister-free films, laminates of low void content, binders for laminates, varnishes, and adhesives.

BACKGROUND OF THE INVENTION

Field of the invention

This invention concerns novel polymeric polyiminoimide compositions and further concerns the preparation of these polyiminoimides from polyamide nitrile precursors.

Description of the prior art

It is known that aromatic polyimides can be formed by reacting an aromatic tetracarboxylic dianhydride and an aromatic diamine to form a polyamide acid which is later converted to a polyimide. During formation of polyimide, however, water or other volatile materials are often released. This, of course, may result in blistering film surfaces and laminates with large numbers of voids. In contrast, the polyiminoimides of this invention are formed without the release of volatile by-products and, therefore, are capable of forming blister-free films, laminates of low void content, binders, adhesives and varnishes without sacrificing the high thermal stability properties found in polyimides.

SUMMARY OF THE INVENTION

According to the present invention there is provided a new class of polymeric compositions having the following recurring structural unit:

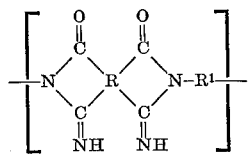

wherein R is an aromatic tetravalent organic radical; and wherein $R^1$ is a divalent organic radical containing at least two carbon atoms.

These novel compositions are called polyiminoimides and may be prepared by first forming a polyamide nitrile having the following recurring structural unit:

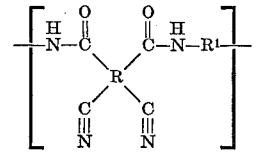

wherein R and $R^1$ have the same meaning as above. This polyamide nitrile is then heated to yield a polyiminoimide.

DESCRIPTION OF THE INVENTION

The polyiminoimides of this invention are characterized by a recurring unit having the following structural formula:

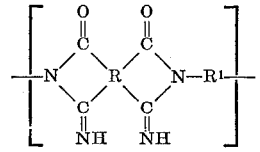

wherein R is an aromatic tetravalent organic radical, i.e., R is:

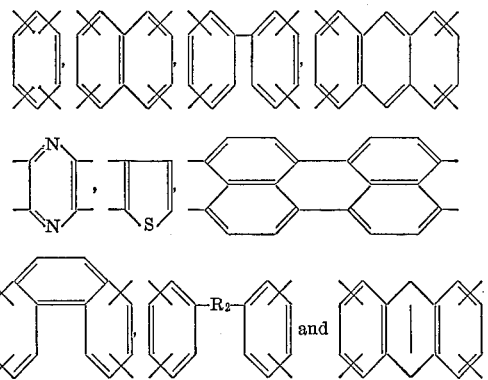

wherein $R_2$ is selected from the group consisting of an alkylene chain having 1–4 carbon atoms, —O—, —S—,

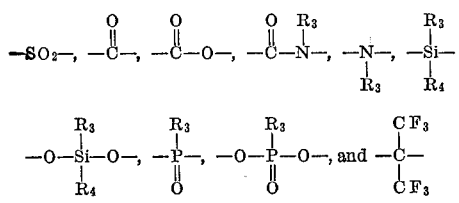

wherein $R_3$ and $R_4$ are alkyl or aryl, and substituted groups thereof. $R^1$ in the above formula is a divalent radical and can be selected from the following groups: aromatic, aliphatic, cycloaliphatic, combination of aromatic and aliphatic, heterocyclic, bridged organic radicals wherein the bridge is oxygen, nitrogen, sulfur, silicon or phosphorus, and substituted groups thereof. The preferred $R^1$ groups are aromatic, specifically from the following groups: phenylene, naphthylene, biphenylene, anthrylene, furylene, benzfurylene and

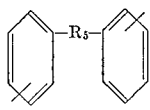

wherein $R_5$ is selected from the group consisting of $R_2$ and —$CF_2$—, and —NH—.

These polyiminoimides have outstanding physical and chemical properties which make them particularly useful for binders for sheet structures, adhesives, self-supporting films and similar uses.

To prepare those polymers, a polyamide-acid is first made by reacting at least one organic diamine and at least one dianhydride to form a composition having recurring units of the following structural formula:

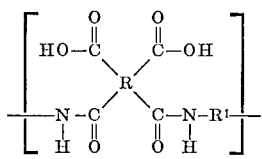

wherein R and $R^1$ have the same meaning as above. Suitable processes for preparing the polyamide-acid are described in U.S. Pat. 3,179,614, issued Apr. 20, 1965, to Edwards and U.S. Pat. 3,391,120, issued July 2, 1968, to Fritz. These processes involve the preparation of a polyamide-acid having an inherent viscosity of at least 0.1, preferably 0.3 to 5, by the reaction of the diamine and the dianhydride in an organic solvent for at least one of the reactants, the solvent being inert to the reactants, for a time and at a temperature below 175° C., sufficient to provide in most instances at least 50% of the corresponding polyamide-acid. It is understood, however, that mixtures of various diamines and dianhydrides can be utilized to make polyamide-acid copolymers.

One suitable process for converting the polyamide-acid compositions to the polyiminoimide compositions of this invention involves treating the polyamide-acid with a dehydrating agent to form a polyisoimide or, more accurately, a polyiminolactone characterized by the following recurring units, in which R and $R^1$ have the meaning previously described:

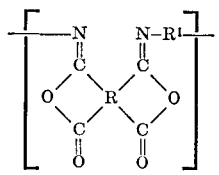

These polyisoimides can be prepared by treating a polyamide-acid with a compound from the group consisting of lower fatty acid halides, halogenated lower fatty acid halides, halogenated lower fatty acid anhydrides, aryl phosphonic dihalides and thionyl halides according to the procedures described in U.S. 3,271,366, issued Sept. 6, 1966 to Kreuz. Alternatively, the polyisoimides can be prepared by treating a polyamide acid with N,N'-disubstituted carbondiimides of the formula

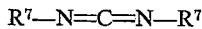

$R^7$—N=C=N—$R^7$ wherein $R^7$ is alkyl or aryl, preferably n-butyl, phenyl, meta-tolyl, para-tolyl, meta-chlorophenyl, para-chlorophenyl, meta-nitrophenyl, cyclohexyl, para-methoxyphenyl or alpha-naphthyl according to the procedures described in U.S. 3,282,898, issued Nov. 1, 1966 to Angelo.

The method described in U.S. 3,271,366 for converting polyamide acid to polyisoimide involves the addition of one of the following cyclizing agents to the polyamide-acid solution: lower fatty acid halide, halogenated lower fatty acid halide, halogenated lower fatty acid anhydride, aryl phosphonic dihalide and thionyl halide. Representative cyclizing agents in this group include: acetyl chloride, bromide, iodide and fluoride; propionyl chloride, bromide, iodide and fluoride; isobutyryl chloride, bromide; n-butyryl chloride, bromide; valeryl chloride; mono-, di-, and tri-chloroacetyl chloride; bromoactyl bromide; chloroacetic anhydride; trifluoroacetic anhydride; phenyl phosphonic dichloride; thionyl chloride, bromide; fluoride and chlorofluoride. Some of the cyclizing agents operate successfully alone; e.g., trifluoroacetic anhydride. The others benefit by the coaction of a tertiary amine; and the cyclizing agent is usually added at room temperature (20–30° C.) along with the tertiary amine. The tertiary amine may be selected from the following: trimethylamine, triethylamine, tri-n-butylamine, N,N-dimethylanolamine, N,N-dimethyldoecylamine, triethylenediamine, pyridine, the picolines, 2,6-lutidine, 2,4,6-collidine, quinoline, pyrazine and 2-methylpyrazine. Three particularly useful treatments for forming polylactones are: treatment of the polyamide-acid composition with chloroacetic anhydride and 2-methyl-pyrazine; with phenyl phosphonic dichloride and pyridine; and with trifluoroacetic anhydride alone.

Another method for making the polyisoimide compositions involves adding an N,N'-disubstituted carbodiimide in a solvent, e.g., N,N-dicyclohexyl carbodiimide in N,N-dimethylacetamide. The solvent is usually the same solvent that had been used in forming the polyamide-acid. It is necessary to add at least the stoichiometric amount of the carbodiimide (at least 1 mole per amide-acid linkage). Water is removed and added to the carbodiimide converting the latter to a substituted urea:

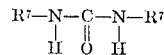

The urea usually precipitates and is removed by centrifuging or filtering, leaving a solution of the polylactone. If the urea does not precipitate, it can be removed by washing.

The polyisoimide is then treated with anhydrous ammonia, at a temperature of 15° to 100° C. in liquid or vapor state to form a polyamide-amide having the following recurring units, in which R and $R^1$ have the meaning previously described:

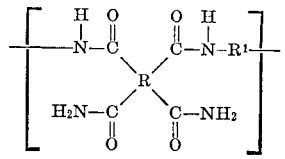

The operable amine compound is ammonia. This reaction is usually performed at room temperature.

Another process for preparing the polyamide-amide compositions, is described in U.S. 3,316,212, issued Apr. 25, 1967 to Angelo et al. and involves reacting at least one diimide of an aromatic tetracarboxylic acid dianhydride and at least one aromatic diamine in an organic solvent for at least one of the reactants, preferably the diimide, the solvent being inert to the reactants, for a time (usually several hours) and at a temperature (usually 75–150° C.) sufficient to provide the polyamide-amide.

The polyamide-amide is then converted to a polyamide nitrile by treating the polyamide-amide with a dehydrating agent which will not cause cyclization of the amide such as trifluoro acetic anhydride. The polyamide nitrile compositions are characterized by recurring units of the following structural formula:

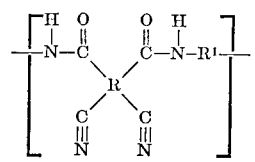

wherein R and R¹ have the meaning previously described. The polyamide-nitrile can, if desired, be easily converted to a polyimino-imide without the evolution of volatiles by the application of heat.

After formation of the polyamide-acid, all the reactions are preferably carried out at room temperature to minimize the possibility of conversion to insoluble polyimides. Although temperatures as high as 100° C. are feasible, lower temperatures are desired.

The solvents useful in the solution polymerization process for synthesizing the polyamide-acid compositions are the organic solvents whose functional groups do not react with either of the reactants (the diamines or the dianhydrides) to any appreciable extent. Besides being inert to the system, and preferably, being a solvent for the polyamide-acid, the organic solvent must be a solvent for at least one of the reactants, preferably for both of the reactants. To state it another way, the organic solvent is an organic liquid other than either reactant or homologs of the reactants that is a solvent for at least 1 reactant, and contains functional groups, the functional groups being groups other than monofunctional primary and secondary amino groups and other than the monofunctional dicarboxyl-anhydro groups. The normally liquid organic solvents of the N,N-dialkylcarboxylamide class are useful as solvents in the process. The preferred solvents are the lower molecular weight members of this class, particularly N,N-dimethylformamide and N,N-dimethylacetamide. They may easily be removed from the polyamide-acid and/or polyamide-acid shaped articles by evaporation, displacement of diffusion. Other typical compounds of this useful class of solvents are: N,N-diethylformamide, N,N-diethylacetamide, N,N-dimethylmethoxy acetamide, N-methyl caprolactam, etc. Other solvents which may be used are: dimethylsulfoxide, N-methyl-2-pyrrolidone, tetramethyl urea, pyridine, dimethylsulfone, hexamethylphosphoramide, tetramethylene sulfone, formamide, N-methylformamide and butyrolactone. The solvents can be used alone, in combinations of solvents or in combination with poor solvents such as benzene, benzonitrile, dioxane, xylene, toluene and cyclohexane.

It should be understood that it is not necessary that the polymeric components of the composition to be formed into a shaped article be composed entirely of the polyamide-acid.

Furthermore, in determining a specific time and a specific temperature for forming the polyamide-acid of a specified diamine and a specified dianhydride, several factors must be considered. The maximum permissible temperature will depend on the diamine used, the dianhydride used, the particular solvent, the percentage of polyamide-acid desired in the final composition and the minimum period of time that one desires for the reaction. For most combinations of diamines and dianhydrides falling within the definitions given above, it is possible to form compositions of 100% polyamide-acid by conducting the reaction below 100° C. However, temperatures up to 175° C. may be tolerated to provide shapeable compositions. To obtain the maximum inherent viscosity, i.e., maximum degree of polymerization, for any particular combination of diamine, dianhydride, solvent, etc., and thus produce ultimately shaped articles such as films and filaments of optimum toughness, it has been found that the temperature throughout the reaction should be maintained below 60° C., preferably below 50° C.

The degree of polymerization of the polyamide-acid is subject to deliberate control. The use of equal molar amounts of the reactants under the prescribed conditions provides polyamide-acids of very high molecular weight. The use of either reactant in large excess limits the extent of polymerization. Besides using an excess of one reactant to limit the molecular weight of the polyamide-acid, a chain terminating agent such as phthalic anhydride may be used to "cap" the ends of the polymer chains.

In the preparation of the polyamide-acid, it is desired that the molecular weight be such that the inherent viscosity of the polymer is at least 0.1, preferably 0.3–5.0. The inherent viscosity is measured at 30° C. at a concentration of 0.5% by weight of the polymer in a suitable solvent, e.g., N,N-dimethylacetamide.

The quantity of organic solvent used in the process need only be sufficient to dissolve enough of one reactant, preferably the diamine, to initiate the reaction of the diamine and the dianhydride. It has been found that the most successful results are obtained when the solvent represents at least 60% of the final solution. That is, the solution should contain 0.05–40% of the polymeric component.

The inherent viscosity of the polyisoimides, polyamide-amides, polyamide nitriles and polyimino-imides described herein is about 0.1 to 5.0. Inherent viscosity, which is directly related to the molecular weight of a polymer, is defined by L. H. Cragg in the Journal of Colloid Science, volume I, pages 261–9 (May 1946) as:

Inherent Viscosity =

$$\frac{\text{natural logarithm relative viscosity}}{C}$$

where relative viscosity is the ratio of the solution viscosity to the solvent viscosity, and C is the concentration of solute in solution measured as grams of polymer per 100 ml. of solution.

Starting materials for forming the polyiminoimides of this invention are various diamines and dianhydrides. Suitable diamines are characterized by the formula

$$H_2N-R_1-NH_2$$

wherein $R_1$ has the meaning previously described. Among the diamines which are suitable for use in the present invention are:

metaphenylene diamine
para-phenylene diamine
4,4′-diamino-diphenyl propane
4,4′-diamino-diphenyl methane benzidine
4,4′-diamino-diphenyl sulfide
4,4′-diamino-diphenyl sulfone
3,3′-diamino-diphenyl sulfone
4,4′-diamino-diphenyl ether
2,6-diamino-pyridine
bis(4-amino-phenyl) diethyl silane
bis(4-amino-phenyl) diphenyl silane
3,3′-dichloro-benzidine
bis(4-amino-phenyl) ethyl phosphine oxide
bis(4-amino-phenyl) phenyl phosphine oxide
bis-(4-amino-phenyl)-N-phenylamine
bis(4-amino-phenyl-N-methyl-amine
1,5-diamino-naphthalene
3,3′-dimethyl-4,4′-diamino-biphenyl
3,3′-dimethoxy-benzidine
2,4-bis(beta-amino-t-butyl)toluene
bis-(para-beta-amino-t-butyl-phenyl) ether
para-bis(2-methyl-4-amino-pentyl) benzene
para-bis-(1,1-dimethyl-5-amino-pentyl) benzene
m-xylylene diamine
p-xylylene diamine
3,3′-diamino adamantane
3,3′-diamino-1,1′-biadamantane
3,3′-diaminomethyl-1,1′-biadamantane
bis(para-amino-cyclohexyl)methane
hexamethylene diamine
heptamethylene diamine
octamethylene diamine
nonamethylene diamine
decamethylene diamine
3-methylheptamethylene diamine
4,4-dimethylheptamethylene diamine
2,11-diamino-dodecane
1,2-bis-(3-amino-propoxy) ethane
2,2-dimethyl propylene diamine 3-methoxy-hexamethylene diamine
2,5-dimethylheptamethylene diamine
5-methylnonamethylene diamine
1,4-diamino-cyclohexane
1,2-diamino-octadecane
2,5-diamino-1,3,4-oxadiazole
$H_2N(CH_2)_3O(CH_2)_2O(CH_2)_3NH_2$
$H_2N(CH_2)_3S(CH_2)_3NH_2$
$H_2N(CH_2)_3N(CH_2)_2NH_3$ Dianhydrides which are suitable for use in forming the compositions of this invention are characterized by the following formula:

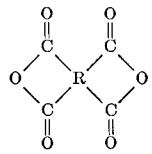

wherein R has the meaning previously described. The preferred dianhydrides are those in which the 4 carbonyl groups of the dianhydride are each attached directly to separate carbon atoms in a ring of the dianhydride and wherein the carbon atoms of each pair of carbonyl groups is directly attached to adjacent carbon atoms in the R group to provide a 5-membered ring as follows:

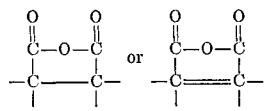

Illustrations of dianhydrides suitable for use in the present invention include:

pyromellitic dianhydride
2,3,6,7-naphthalene tetracarboxylic dianhydride
3,3',4,4'-diphenyl tetracarboxylic dianhydride
1,2,5,6-naphthalene tetracarboxylic dianhydride
2,2',3,3'-diphenyl tetracarboxylic dianhydride
2,2-bis(3,4-dicarboxyphenyl) propane dianhydride
bis(3,4-dicarboxyphenyl) sulfone dianhydride
3,4,9,10-perylene tetracarboxylic dianhydride
bis(3,4-dicarboxyphenyl) ether dianhydride
naphthalene-1,2,4,5-tetracarboxylic dianhydride
naphthalene-1,4,5,8-tetracarboxylic dianhydride
decahydronaphthalene-1,4,5,8-tetracarboxylic dianhydride
2,6-dichloronaphthalene-1,4,5,8-tetracarboxylic dianhydride
2,7-dichloronaphthalene-1,4,5,8-tetracarboxylic dianhydride
2,3,6,7-tetrachloronaphthalene-1,4,5,8-tetracarboxylic dianhydride
phenanthrene-1,8,9,10-tetracarboxylic dianhydride
2,2-bis(2,3-dicarboxyphenyl) propane dianhydride
1,1-bis(2,3-dicarboxyphenyl) ethane dianhydride
1,1-bis(3,4-dicarboxyphenyl) ethane dianhydride
bis(2,3-dicarboxyphenyl) methane dianhydride
bis(3,4-dicarboxyphenyl) methane dianhydride
bis(3,4-dicarboxyphenyl) sulfone dianhydride
benzene-1,2,3,4-tetracarboxylic dianhydride
3,4,3',4'-benzophenone tetracarboxylic dianhydride
2,3,2',3'-benzophenone tetracarboxylic dianhydride
2,3,3',4'-benzophenone tetracarboxylic dianhydride
pyrazine-2,3,5,6-tetracarboxylic dianhydride
thiophene-2,3,4,5-tetracarboxylic dianhydride
1,4-dicarbethoxy-2,5-dicarboxy benzene dianhydride
1,5-dicarboxymethoxy-2,4-dicarboxybenzene dianhydride
bis(3,4-carboxyphenyl)ether dianhydride
bis(3,4-dicarboxyphenyl) sulfide dianhydride
hexafluoro isopropylidine-bis-phthalic anhydride, etc.

The polyiminoimides of this invention may be used as binders for sheet structures, adhesives, self-supporting films or in combination with other materials for use as coating compositions. Such coating compositions may be be pigmented with such compounds as titanium dioxide in amounts of 5-200% by weight or combined with various inert fillers. These compositions may be applied to a variety of substrates, for example, metals, i.e., copper, brass, aluminum, steel, etc., the metals in the form of sheets, fibers, wires, screening, etc.; glass in the form of sheets, fibers, foams, fabrics, etc.; polymeric materials, e.g., cellulosic materials such as cellophane, wood, paper, etc., polyolefins such as polyethylene, polypropylene, polystyrene, etc., polyesters such as polyethylene terephthalate, etc., perfluorocarbon polymers such as polytetrafluoroethylene, copolymers of tetrafluoroethylene with hexafluoropropylene, etc., polyurethanes, all polymeric materials in the form of sheets, fibers, foams, woven and non-woven fabrics, screening, etc.; leather sheets; etc.

The following examples illustrate the preparation and use of the polyiminoimide and polyamide nitrile compositions of this invention. All parts and percentages are by weight, unless otherwise specified.

EXAMPLES

Example 1

A polyamide-acid is prepared from pyromellitic dianhydride and oxydianiline according to the procedures set out in U.S. 3,179,614, issued Apr. 20, 1965, to Edwards. Then fifty grams of an 18% solution of the polyamide-acid in N-methyl pyrrolidine is diluted with 50 ml. of benzene. This solution is slowly added to a solution of 50 grams of trifluoro-acetic anhydride in 250 ml. of benzene which is stirring in a blender. A polyisoimide polymer is immediately precipitated as a reddish orange solid. The polymer is isolated by filtration and washed with 250 ml. of benzene and then vacuum dried. The polyisoimide polymer is soluble in N-methyl pyrrolidone and forms clear films when cast and dried.

To prepare a polyamide-amide from the polyisoimide polymer, the polyisoimide is first added to benzene and stirred. Then anhydrous ammonia is bubbled into the benzene-polymer mixture until the reddish color of the isoimide is replaced by the light off-white color of the solid polyamide-amide. The polyamide-amide solid is then isolated by filtration, washed with benzene and vacuum dried.

Next, polyamide-nitrile is prepared from the polyamide-amide by mixing the polyamide-amide with trifluoroacetic anhydride and heating the mixture until boiling takes place. After most of the liquid has evaporated, the resultant slurry is removed from the heat and the remainder of the solvent drawn off, using a vacuum. The resultant solid polyamide-nitrile is yellow in color and is soluble in N-methyl pyrrolidone and has an inherent viscosity of 0.19. A film of the polyamide nitrile is cast from N-methyl pyrrolidone and baked at 30 minutes at 600° F. to form a polyiminoimide without the release of volatiles. Films of the polyiminoimide are tough, flexible and display properties similar to those of polyimides.

Example 2

A polyamide-amide is prepared from pyromellitic dianhydride and oxydianiline according to the procedure described in Example 1. A 2.5 gram sample of the polyamide-amide is first dissolved in dimethyl formamide and then added to a blender. Next, 4.14 grams (2.5 ml.) of thionyl chloride is added to the polyamide-amide solution. An immediate exothermic reaction results raising the temperature of the mixture from room temperature to 41° C. Within 1½ minutes, the polyamide-amide is dissolved to give a clear orange solution. This solution is stirred for 20 minutes, then poured into 250 ml. of water. The yellow polymer which precipitates is washed with water, washed with acetone and dried in a vacuum. The yield of the yellow polymer is approximately 93 percent. By infrared analysis the polymer is identified as a polyamide-nitrile. The inherent viscosity of the polyamide-nitrile is 0.19 as measured in 0.5 percent methyl pyrrolidone at 25° C. The polyamide-nitrile is soluble in N,N-dimethylacetamide, dimethylsulfoxide and N,N-dimethylformamide and N-methyl pyrrolidone. A solid film of the polyamide-nitrile is converted to polyiminoimide without the release of volatiles by heating the film at 200° C. for 1 hour. The polymer formed upon heating is found by infrared inspection to consist of good quality polyiminoimide.

Example 3

A polyamide-acid is prepared by reacting 32.2 grams of benzophenone tetracarboxylic dianhydride (BTDA) and a stirring solution of 20.0 grams of oxydianiline in 209 grams of N-methyl pyrrolidone. Next, 69.2 grams of the polyamide-acid solution (10 grams of polymer) is diluted with 50 grams of benzene and then poured into a mixture of 50 ml. of trifluoroacetic anhydride and 200 ml. of benzene which is stirring in a blender. The orange solid which precipitates is identified by infrared analysis as a polyisoimide. Next, 11.3 grams of the polyisoimide is mixed with 250 ml. of benzene. Ammonia is then passed through the mixture while it is being stirred until the orange color changes to a yellow-tan color. The resultant polymer is isolated by filtration, washed with benzene and acetone and dried under vacuum conditions. This polymer is identified as a polyamide-amide. Finally 2.5 grams of the polyamide-amide is dissolved in 50 ml. of dimethyl formamide and treated with 2.5 ml. of thionyl chloride. An immediate exotherm results raising the temperature to 38° C. After 25 minutes of stirring, the solution is poured into 400 ml. of water to precipitate the yellow polyamide-nitrile formed by reaction. After washing with water and acetone and drying, the polyamide-nitrile weighs 1.9 grams. Solid films of the polyamide-nitrile are converted to polyiminoimide without the release of volatiles by heating at 150–200° C. The inherent viscosities (measured in N-methyl pyrrolidone at 25° C.) of the polymers is as follows:

Polyisoimide _____ 0.54
Polyamide-amide _____ 0.57
Polyamide-nitrile _____ 0.14

The polyiminoimide displays physical properties similar to polyimides.

Example 4

The procedure of Example 3 is repeated except that bis-(3,4-dicarboxyphenyl) sulfone dianhydride is substituted for benzophenone tetracarboxylic dianhydride. After preparation of the polyamide-amide, 5.0 grams of the polyamide-amide is dissolved in 50 ml. of dimethyl formamide and cooled in an ice bath. Then a cold solution of 3.0 ml. (4.96 grams) of thionyl chloride in 10 ml. of ice cold dimethyl formamide is added to polyamide-amide solution with stirring. The yellow polymer which precipitates is washed with cold water and dried under vacuum. This polymer is identified as a polyamide-nitrile. Upon heating the polyamide-nitrile is converted to a polyiminoimide. The inherent viscosities of the polymers are:

Polyisoimide _____ 0.51
Polyamide-amide _____ 0.62
Polyiminoimide _____ 0.19

Examples 5–10

When each of the following diamines is substituted for the oxydianiline of Example 1 and the procedure of Example 1 is followed, the resultant polyamide-nitriles and polyiminoimides formed have properties similar to the properties of the polyamide-nitrile and polyiminoimide of Example 1.

Example
5—meta-phenylene diamine
6—4,4'-diamino-diphenyl sulfone
7—3,3'-diamino-diphenyl sulfone
8—2,2 bis(4-aminophenyl)propane
9—bis(4-aminophenyl)methane
10—bis(4-aminophenyl)sulfone Examples 11–16

When each of the following dianhydrides is substituted for the pyromellitic dianhydride of Example 3 and the procedure of Example 3 is followed, the resultant polyamide-nitriles and polyiminoimides formed have properties similar to the properties of the polyamide-nitrile and polyiminoimide of Example 3.

Example
11—bis-(3,4-dicarboxyphenyl) sulfone dianhydride
12—bis-(3,4-dicarboxyphenyl) ether dianhydride
13—3,3',4,4'-diphenyl tetracarboxylic dianhydride
14—2,2-bis(3',4'-dicarboxy phenyl)propane dianhydride
15—2,2',3,3'-diphenyl tetracarboxylic dianhydride
16—hexafluoro isopropylidine-bis-phthalic anhydride

What is claimed is:
1. A polyiminoimide having an inherent viscosity of about 0.1 to 5.0 measured at 30° C. at a concentration of 0.5% by weight of the polymer in $N_1N$-dimethylacetamide and consisting essentially of the recurring structural unit:

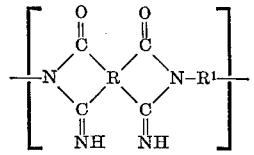

wherein R is a radical selected from the group consisting of:

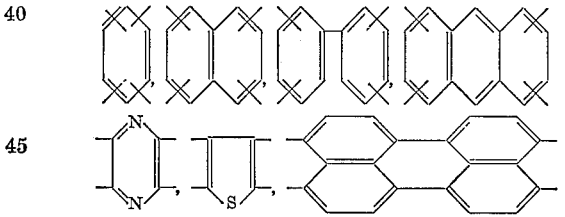

wherein $R_2$ is selected from the group consisting of an alkylene chain having 1–4 carbon atoms,

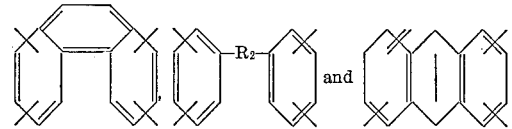

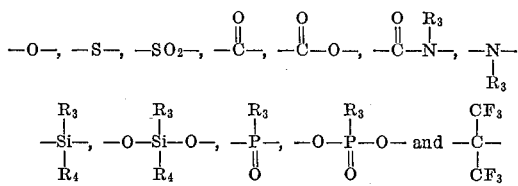

wherein $R_3$ and $R_4$ are each selected from the group consisting of alkyl and aryl; and wherein $R_1$ is a divalent radical selected from the group consisting of phenylene, naphthalene, biphenylene, anthrylene, furylene, benzfurylene and

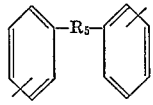

wherein $R_5$ is selected from the group consisting of $R_2$ and $-CF_2-$ and $-NH-$.

2. The polyiminoimide of claim 1 wherein R is selected from the group consisting of the aromatic radicals in pyromellitic dianhydride, 3,4,3',4'-benzophenone tetracarboxylic dianhydride, bis(3,4-dicarboxyphenyl)sulfone dianhydride, bis(3,4-dicarboxyphenyl)ether dianhydride, 2,2-bis(3',4'-dicarboxyphenyl)propane dianhydride, 2,2',3,3'-diphenyl tetracarboxylic dianhydride and hexafluoroisopropylidine-bis-phthalic anhydride.

3. The polyiminoimide of claim 1 wherein R is:

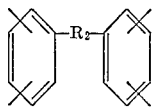

wherein $R_2$ is selected from the group of an alkylene chain having 1-4 carbon atoms,

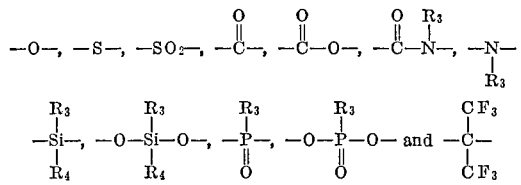

wherein $R_3$ and $R_4$ are each selected from the group consisting of alkyl and aryl; and wherein $R_1$ is a divalent radical selected from the group consisting of phenylene, naphthalene, bihpenylene, anthrylene, furylene, benzfurylene and

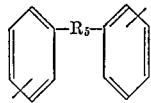

wherein $R_5$ is selected from the group consisting of $R_2$ and —$CF_2$— and —NH—.

4. The polyiminoimide of claim 1 wherein $R_1$ is selected from the group consisting of metaphenylene, 4,4'-diphenyl propane, 4,4'-diphenyl methane, 4,4'-diphenyl ether, 4,4'-diphenyl sulfone, and mixtures thereof.

5. The polyiminoimide of claim 3 wherein $R_1$ is

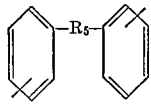

wherein $R_5$ is selected from the group consisting of $R_2$ and —$CF_2$— and —NH—.

6. The polyiminoimide of claim 4 wherein R is selected from the group consisting of

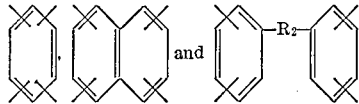

wherein $R_2$ is selected from the group consisting of

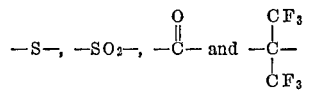

7. A polyamide nitrile having an inherent viscosity of about 0.1 to 5.0 and consisting essentially of the recurring structural unit:

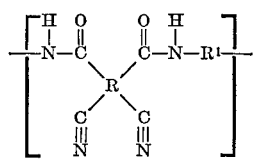

wherein R is a radical selected from the group consisting of:

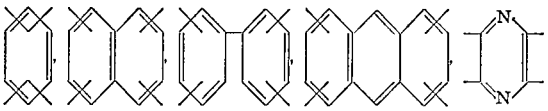

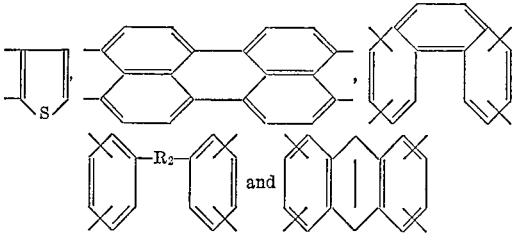

wherein $R_2$ is selected from the group consisting of an alkylene chain having 1-4 carbon atoms,

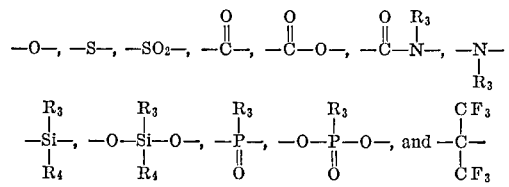

wherein $R_3$ and $R_4$ are each selected from the group consisting of alkyl and aryl; and wherein $R_1$ is a divalent radical selected from the group consisting of phenylene, naphthalene, biphenylene, anthrylene, furylene, benzfurylene and

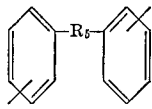

wherein $R_5$ is selected from the group consisting of $R_2$ and —$CF_2$— and —NH—.

8. The polyamide nitrile of claim 7 wherein R is selected from the group consisting of the aromatic radicals in pyromellitic dianhydride, 3,4,3',4'-benzophenone tetracarboxylic dianhydride, bis(3,4-dicarboxyphenyl)sulfone dianhydride, bis(3,4 - dicarboxyphenyl)ether dianhydride, 2,2 - bis(3',4' - dicarboxyphenyl)propane dianhydride, 2,2',3,3'-diphenyl tetracarboxylic dianhydride and hexafluoroisopropylidine-bis-phthalic anhydride.

9. The polyamide nitrile of claim 7 wherein R is

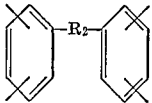

wherein $R_2$ is selected from the group of an alkylene chain having 1-4 carbon atoms,

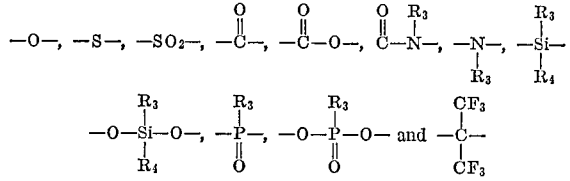

wherein $R_3$ and $R_4$ are each selected from the group consisting of alkyl and aryl; and wherein $R_1$ is a divalent radical selected from the group consisting of phenylene, naphthalene, biphenylene, anthrylene, furylene, benzfurylene and

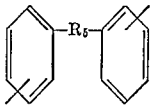

wherein $R_5$ is selected from the group consisting of $R_2$ and —$CF_2$— and —NH—.

10. The polyamide nitrile of claim 7 wherein $R_1$ is selected from the group consisting of metaphenylene, 4,4'-diphenyl propane, 4,4'-diphenyl methane, 4,4'-diphenyl ether, 4,4'-diphenyl sulfone, and mixtures thereof.

11. The polyamide nitrile of claim 9 wherein $R_1$ is

[structure with $R_5$ connecting two phenyl rings]

wherein $R_5$ is selected from the group consisting of $R_2$ and —$CF_2$— and —NH—.

12. The polyamide nitrile of claim 10 wherein R is selected from the group consisting of

[structures], and [structure]

wherein $R_2$ is selected from the group consisting of $$-O-,\ -S-,\ -SO_2-,\ -\overset{O}{\underset{\|}{C}}-\ \text{and}\ -\overset{CF_3}{\underset{\underset{CF_3}{|}}{\overset{|}{C}}}-$$

13. A process for preparing a polyamide nitrile which comprises treating a polyamide-amide having an inherent viscosity of about 0.1 to 5.0 and consisting essentially of the recurring structural unit $$\left[\begin{array}{c}\overset{H}{\underset{|}{N}}-\overset{O}{\underset{\|}{C}}\diagdown\diagup\overset{O}{\underset{\|}{C}}-\overset{H}{\underset{|}{N}}-R^1-\\ R \\ H_2N-\overset{}{\underset{\|}{C}}\diagup\diagdown\overset{}{\underset{\|}{C}}-NH_2\\ O\quad\quad O\end{array}\right]$$

wherein R is a radical selected from the group consisting of:

[structures]

[structures]

[structure with $R_2$], and

[structure]

wherein $R_2$ is selected from the group consisting of an alkylene chain having 1–4 carbon atoms, $$-O-,\ -S-,\ -SO_2-,\ -\overset{O}{\underset{\|}{C}}-,\ -\overset{O}{\underset{\|}{C}}-O-,\ -\overset{O}{\underset{\|}{C}}-\overset{R_3}{\underset{|}{N}}-,\ -\overset{R_3}{\underset{|}{N}}-,\ -\overset{R_3}{\underset{\underset{R_4}{|}}{\overset{|}{Si}}}-$$

$$-O-\overset{R_3}{\underset{\underset{R_4}{|}}{\overset{|}{Si}}}-O-,\ -\overset{R_3}{\underset{\|}{\overset{|}{P}}}-,\ -O-\overset{R_3}{\underset{\|}{\overset{|}{P}}}-O-,\ \text{and}\ -\overset{CF_3}{\underset{\underset{CF_3}{|}}{\overset{|}{C}}}-$$

wherein $R_3$ and $R_4$ are each selected from the group consisting of alkyl and aryl; and wherein $R_1$ is a divalent radical selected from the group consisting of phenylene, naphthalene, biphenylene, anthrylene, furylene, benzfurylene and

[structure with $R_5$ connecting two phenyl rings]

wherein $R_5$ is selected from the group consisting of $R_2$ and —$CF_2$— and —NH—, with a dehydrating agent which will not cause cyclization of the amine to form a polyamide nitrile having an inherent viscosity of about 0.1 to 5.0 and consisting essentially of recurring units of the formula:

$$\left[\begin{array}{c}\overset{H}{\underset{|}{N}}-\overset{O}{\underset{\|}{C}}\diagdown\diagup\overset{O}{\underset{\|}{C}}-\overset{H}{\underset{|}{N}}-R_1-\\ R \\ \overset{}{\underset{\|}{C}}\diagup\diagdown\overset{}{\underset{\|}{C}}\\ N\quad\quad N\end{array}\right]$$

wherein R and $R_1$ have the same meaning as above.

14. The process of claim 13 wherein said dehydrating agent is selected from the group consisting of trifluoroacetic anhydride and thionyl chloride.

15. The process of claim 13 wherein said polyamide nitrile is heated to form a polyiminoimide having an inherent viscosity of about 0.1 to 5.0 and consisting essentially of the recurring structural unit:

$$\left[\begin{array}{c}\overset{O}{\underset{\|}{C}}\quad\overset{O}{\underset{\|}{C}}\\ -N\diagup\diagdown R\diagup\diagdown N-R_1-\\ \overset{}{\underset{\|}{C}}\diagdown\diagup\overset{}{\underset{\|}{C}}\\ NH\quad NH\end{array}\right]$$

wherein R and $R_1$ have the same meaning as in claim 13.

References Cited

UNITED STATES PATENTS 3,316,212   4/1967   Angelo et al. ————————— 260—47
3,386,966   6/1968   Bach.

WILLIAM SHORT, Primary Examiner

L. L. LEE, Assistant Examiner

U.S. Cl. X.R.

117—123, 132, 138.8, 145, 161; 260—30.8, 32.4, 32.6, 65, 78

PO-1050
(5/69)

UNITED STATES PATENT OFFICE
CERTIFICATE OF CORRECTION

Patent No. 3,516,967        Dated   July 29, 1970

Inventor(s)   Rolf E. Funer

It is certified that error appears in the above-identified patent and that said Letters Patent are hereby corrected as shown below:

Column 10, Claim 1, line 40,   should be 

Column 10, Claim 1, line 50,   should be 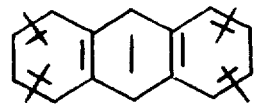

Column 11, Claim 6, line 62 in formula, insert —O—, before —S—.

Column 12, Claim 7, line 10,   should be 

In column 11, Claim 7, line 66; column 13, Claim 13, line 27; column 14, Claim 13, line 19; and column 14, Claim 15, line 38; after "5.0" insert:

--measured at 30°C. at a concentration of 0.5% by weight of the polymer in $N_1$N-dimethylacetamide--.

SIGNED AND
SEALED
DEC 1 - 1970

(SEAL)
Attest:

Edward M. Fletcher, Jr.
Attesting Officer

WILLIAM E. SCHUYLER, JR.
Commissioner of Patents